(12) United States Patent
Go

(10) Patent No.: US 6,201,656 B1
(45) Date of Patent: Mar. 13, 2001

(54) TECHNIQUE FOR OPTIMIZING MR-BIAS CURRENT

(75) Inventor: Sang-Eon Go, Kumi (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/262,808

(22) Filed: Mar. 4, 1999

(30) Foreign Application Priority Data

Mar. 4, 1998 (KR) .................................................. 98-7168

(51) Int. Cl.⁷ ..................................................... G11B 5/03
(52) U.S. Cl. ............................................................. 360/66
(58) Field of Search .................................. 360/66, 51, 53

(56) References Cited

U.S. PATENT DOCUMENTS

| | | |
|---|---|---|
| 4,050,086 | 9/1977 | Harr . |
| 4,220,979 | 9/1980 | Kitamura et al. . |
| 4,245,265 | 1/1981 | Kogure et al. . |
| 4,262,313 | 4/1981 | Mouri . |
| 4,280,153 | 7/1981 | Tin . |
| 4,297,730 | 10/1981 | Kakowaki et al. . |
| 4,344,094 | 8/1982 | Ohtake et al. . |
| 4,379,311 | 4/1983 | Ohkawara . |
| 4,528,602 | 7/1985 | Crick et al. . |
| 4,553,179 | 11/1985 | Inami et al. . |
| 4,611,253 | 9/1986 | Kamei et al. . |
| 4,616,273 | 10/1986 | Ishii et al. . |
| 5,196,967 | 3/1993 | Mederer et al. . |
| 5,301,080 | 4/1994 | Ottesen et al. . |
| 5,309,295 | 5/1994 | Bailey et al. . |
| 5,367,411 | 11/1994 | Nishiyama et al. . |
| 5,390,054 | 2/1995 | Youngquist et al. . |
| 5,719,716 | 2/1998 | Suzuki . |
| 5,719,719 | 2/1998 | Tsuyoshi et al. . |
| 5,774,291 | 6/1998 | Contreras et al. . |
| 5,831,782 | 11/1998 | Kohno et al. . |

Primary Examiner—W. Chris Kim
(74) Attorney, Agent, or Firm—Robert E. Bushnell, Esq.

(57) ABSTRACT

A hard disk drive prevents a data read error by optimizing a bias current supplied to an MR-element. Signal patterns of given amplitudes are written in a data area of the recording media, and sample-and-hold values of a read signal in the above signal patterns are read and stored while changing the bias current supplied to a selected MR-element. The stored sample-and-hold values are searched to select a sample-and-hold value equal to the amplitude of the signal patterns written in the data area, and the bias current supplied to the MR-element is determined as an optimal value to obtain the selected sample-and-hold value. The optimal value of the bias current may be written in a maintenance area of the recording media and is then read upon power up of the hard disk drive.

24 Claims, 5 Drawing Sheets

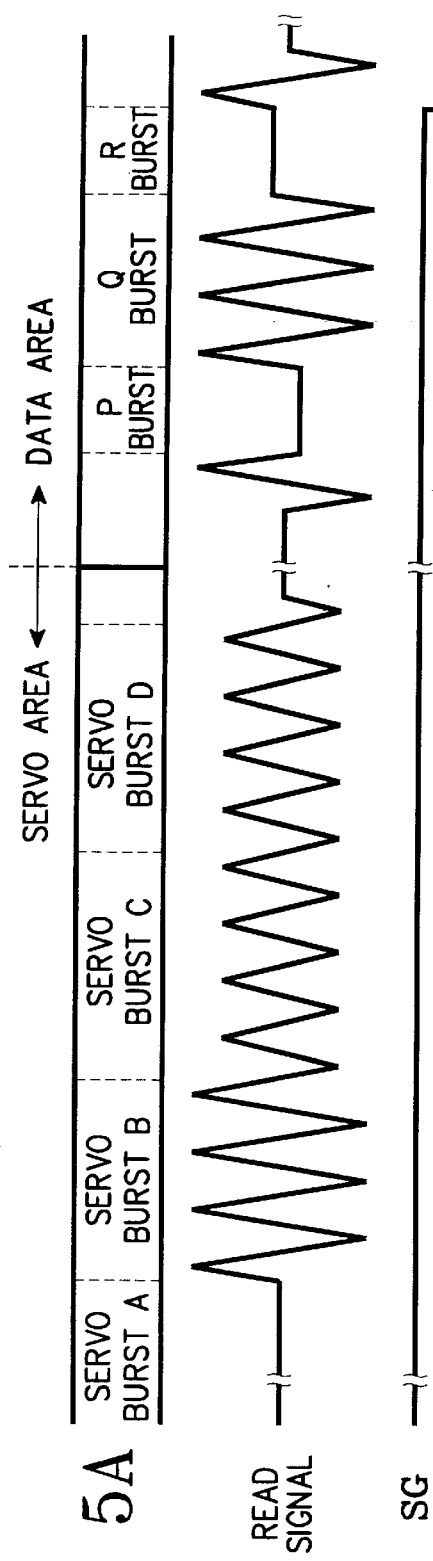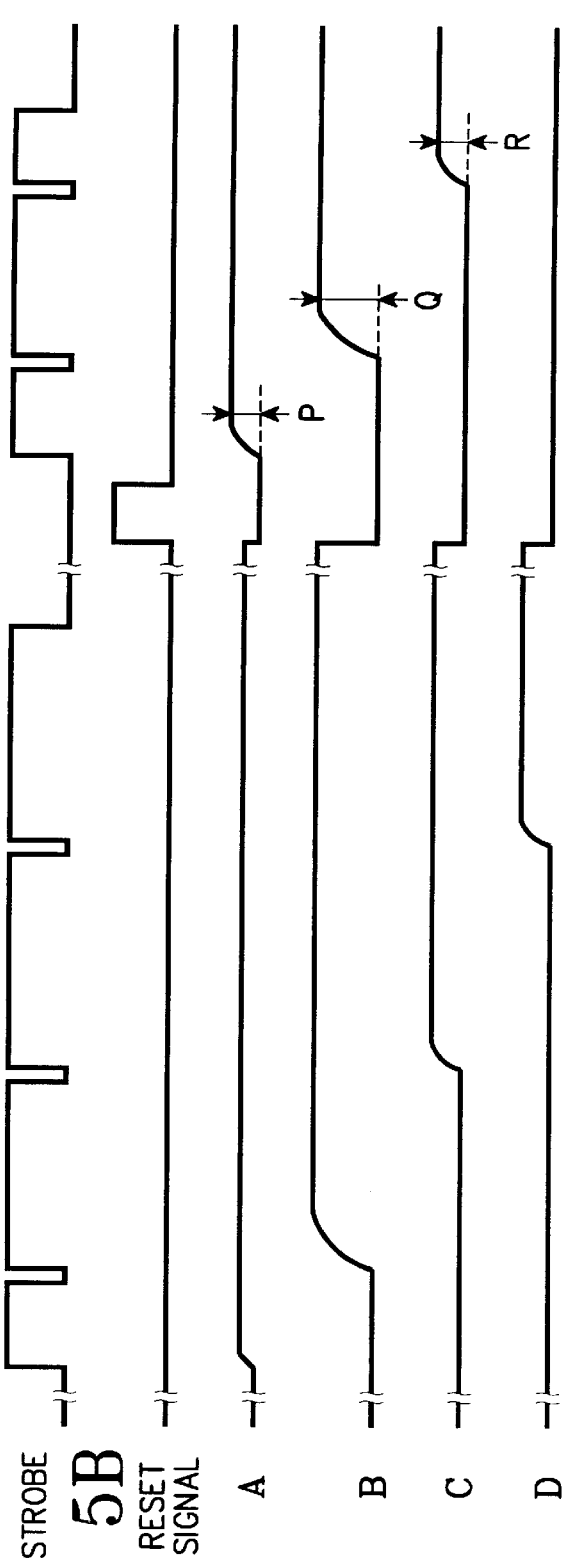

TECHNIQUE FOR OPTIMIZING MR-BIAS CURRENT

CLAIM OF PRIORITY

This application makes reference to, incorporates the same herein, and claims all benefits accruing under 35 U.S.C. §119 from an application entitled Method for Optimizing Mr-Bias Current earlier filed in the Korean Industrial Property Office on Mar. 4, 1998, and there duly assigned Ser. No. 7168/1998 by that Office.

BACKGROUND OF THE INVENTION

1. Field of the Invention

The present invention relates to a magneto resistive (MR) head, and in particular, to a technique for optimizing an MR-bias current by measuring an amplitude of a signal read through an MR-head.

2. Description of the Related Art

A magnetic disk storage, such a hard disk drive, normally employs an MR-head, with an increase in the storage capacity. The MR-head is composed of a thin film head and a MR-sensor for data reading. The MR-sensor changes a resistance according to a change of the magnetic flux from a storage medium, and the change of the resistance is expressed as a read signal. Further, the MR-sensor is provided with a bias current to express the change of the magnetic flux as the read signal. The bias current supplied to the MR-head should be set such that the read signal should be linear with respect to the change of the magnetic flux. Improper setting of the MR-bias current may cause asymmetry and baseline shift of the read signal.

When the MR-bias current is set to an optimal value, the positive and negative pulses of the read signal from the MR-sensor are symmetrical with respect to the base line. However, when the MR-bias current is improperly set, the base lines are shifted up and down, causing an asymmetry of the read signal and a signal component adjacent to the shifted base line may be erroneously considered to be normal data, resulting in a data read error.

The following patents each disclose features in common with the present invention but do not teach or suggest the specifically recited technique for optimizing the MR-bias current in accordance with the present invention:

U.S. Pat. No. 5,719,716 for METHOD OF AND DEVICE FOR AUTOMATIC BIAS CONTROL issued to Suzuki, U.S. Pat. No. 5,719,719 for MAGNETIC DISK DRIVE WITH SENSING CURRENT ADJUSTMENT OF MR HEAD issued to Tsuyoshi et al., U.S. Pat. No. 5,774,291 for VOTAGE MEASUREMENT CIRCUIT FOR A MAGNETORESISTIVE HEAD INSTALLED IN A DISK ENCLOSURE issued to Contreras et al., U.S. Pat. No. 5,831,782 for METHOD AND APPARATUS FOR SUPPLYING OPTIMAL BIAS CURRENT TO A MAGNETIC HEAD issued to Kohno et al., U.S. Pat. No. 4,050,086 for DYNAMIC TRANSDUCER BIASING SIGNAL AMPLIFYING CIRCUITRY issued to Harr, U.S. Pat. No. 5,301,080 for BIAS SERVO LOOP FOR MAGNETO-RESISTIVE READ/WRITE HEAD issued to Ottesen et al., U.S. Pat. No. 5,309,295 for METHOD AND APPARATUS FOR BIASING A MAGNETO-RESISTIVE HEAD issued to Bailey et al., U.S. Pat. No. 5,367,411 for MAGNETIC RECORDING AND REPRODUCING APPARATUS WITH REPRODUCING HEAD OF MAGNETORESISTIVE TYPE HAVING CONTROL OF MAGNETIC BIAS LEVEL issued to Nishiyama et al., U.S. Pat. No. 5,390,054 for METHOD AND SYSTEM FOR MINIMIZING THE ERROR RATE OF A DIGITAL RECORDING SYSTEM BY PREDICTING THE OPTIMAL BIAS CURRENT issued to Youngquist et al., U.S. Pat. No. 5,196,967 for METHOD OF AUTOMATICALLY OPTIMIZING THE RECORDING BIAS FOR A VIDEO SIGNAL, AND ARRANGEMENT FOR CARRYING OUT THE METHOD issued to Mederer et al., U.S. Pat. No. 4,528,602 for ELECTRICAL CALIBRATION ARRANGEMENTS issued to Crick et al., U.S. Pat. No. 4,553,179 for AUTOMATIC RECORDING BIAS CURRENT SETTING APPARATUS issued to Inami et al., U.S. Pat. No. 4,611,253 for MAGNETIC RECORDING AND REPRODUCING DEVICE issued to Kamei et al., U.S. Pat. No. 4,616,273 for TAPE RECORDING APPARATUS PROVIDED WITH A BIAS CONTROL DEVICE issued to Ishii et al., U.S. Pat. No. 4,297,730 for MAGNETIC RECORDING AND REPRODUCING DEVICE issued to Kakowaki et al., U.S. Pat. No. 4,344,094 for METHOD AND APPARATUS DETECTING AND SETTING OPTIMUM TAPE RECORDING BIAS issued to Ohtake et al., U.S. Pat. No. 4,379,311 for RECORDING BIAS SETTING DEVICE FOR A MAGNETIC RECORDING AND REPRODUCING APPARATUS issued to Ohkawara, U.S. Pat. No. 4,220,979 for BIAS LEVEL SETTING CIRCUIT FOR TAPE RECORDERS WITH STAIRCASE HIGH FREQUENCY SIGNAL issued to Kitamura et al., U.S. Pat. No. 4,245,265 for AUTOMATIC TAPE BIAS ADJUSTING AND SIGNAL COMPENSATION RECORDING AND REPRODUCING APPARATUS issued to Kogure et al., U.S. Pat. No. 4,262,313 for BIAS CURRENT SETTING APPARATUS IN A MAGNETIC RECORDING AND REPRODUCING APPARATUS issued to Mouri, and U.S. Pat. No. 4,280,153 for DIGITALLY CONTROLLED AUTOMATIC BIAS CIRCUIT FOR MAGNETIC RECORDING issued to Tin.

SUMMARY OF THE INVENTION

It is therefore an object of the present invention to provide a technique for preventing a data read error by optimizing a bias current supplied to an MR-element in a magnetic disk storage which reads information written on a magnetic disk by using the MR-element.

It is another object of the present invention to provide an MR-bias current optimization technique capable of contributing to an increase in the production yield and reliability of a hard disk drive, by setting an MR-bias current in conformity with the properties of MR-elements by reading/writing a signal having a given write pattern in a hard disk drive which reads information written on the disk using the MR-elements.

To achieve the above object, a technique for optimizing an MR-bias current in a hard disk drive including MR-elements, recording media and a bias current circuit for supplying a bias current to the respective MR-elements includes: writing signal patterns of given amplitudes in a specified area of the recording media; reading sample-and-hold values of a read signal in the signal patterns while changing the bias current supplied to a selected MR-element, and storing the read sample-and-hold values; and searching the stored sample-and-hold values to select a sample-and-hold value equal to the amplitude of the signal patterns written in the specified area, determining the bias current supplied to the MR-element as an optimal value to obtain the selected sample-and-hold value, and storing the optimal value of the bias current in the reading media.

The optimal value of the bias current may be written in a maintenance area of the recording media and is then read upon power up of the hard disk drive.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 5A is a diagram showing a write pattern of the read signal according to an embodiment of the present invention; and FIG. 5B is a diagram showing waveforms of a read signal and control signals according to an embodiment of the present invention.

DETAILED DESCRIPTION OF THE PREFERRED EMBODIMENT

Figure 1A:
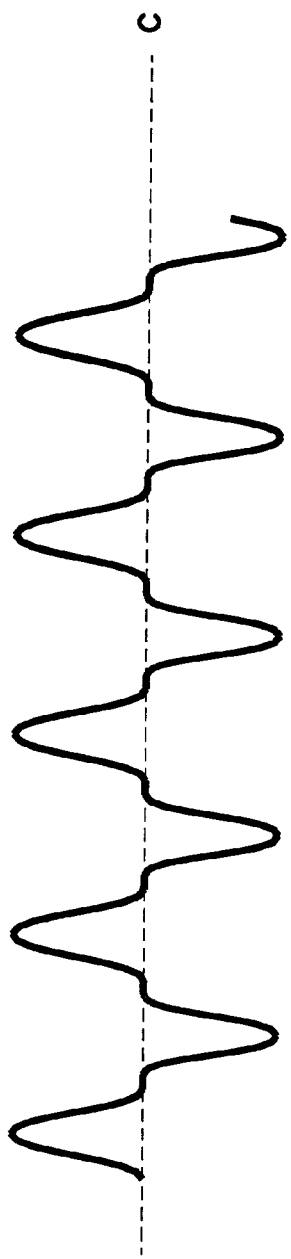
FIGS. 1A and 1B are diagrams showing analog read signals picked up from a disk through an MR-sensor.

Reference will now be made to a preferred embodiment of the present invention with reference to the accompanying drawings in which the like reference numerals denote the like and equivalent elements.

Figure 1B:
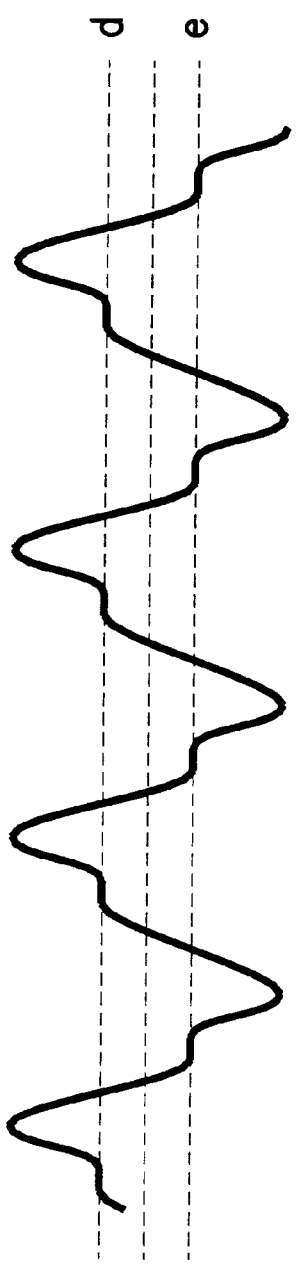

FIGS. 1A and 1B are diagrams showing the analog read signal picked up by the MR-sensor from a disk, wherein FIG. 1A shows a waveform of a normally read signal when the MR-bias current is set to an optimal value, and FIG. 1B shows a waveform of the read signal having the baseline shift phenomenon due to the improper setting of the MR-bias current. In FIGS. 1A and 1B, reference numerals "c", "d" and "e" denote the baselines. When the MR-bias current is set to the optimal value, (+) pulse and (−) pulse of the read signal are symmetrical on the basis of the baseline "c", as shown in FIG. 1A. However, when the MR-bias current is improperly set, the baselines "d" and "e" are shifted up and down, as shown in FIG. 1B. When the baseline is shifted causing asymmetry of the read signal, a signal component adjacent to the shifted baseline may be erroneously considered to be normal data, resulting in a data read error.

Figure 2:
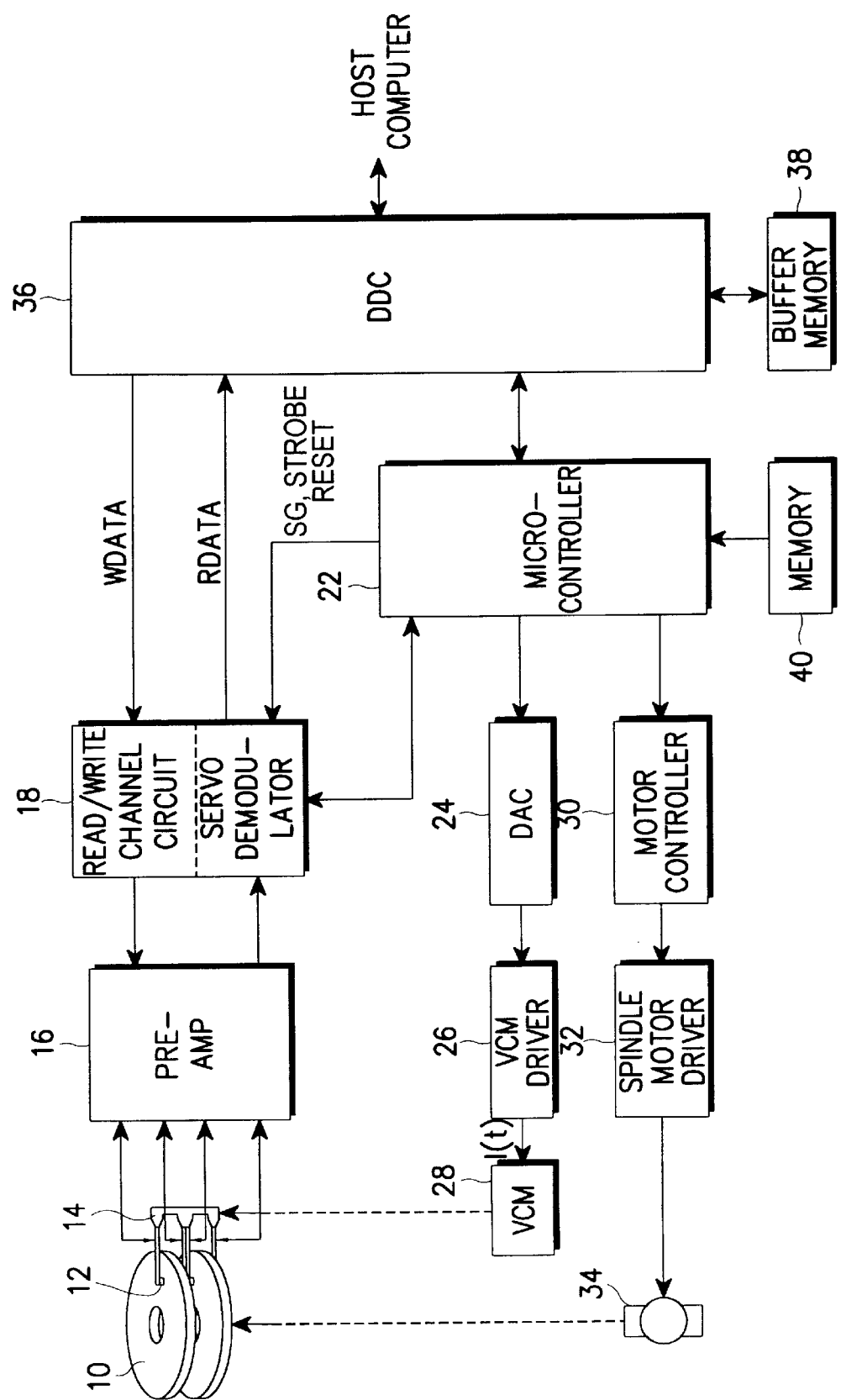
FIG. 2 is a block diagram of a hard disk drive.

FIG. 2 is a block diagram of a hard disk drive having two disks 10 and four MR-heads 12 facing the corresponding surfaces of the disks 10. Referring to FIG. 2, the disks 10 are mounted on an axle of a spindle motor 34 and the respective surfaces of the disks 10 face the corresponding MR-heads 12. Each of the disks 10 has concentric tracks, a parking zone where the MR-heads 12 are located during power-off of the hard disk drive, and a maintenance area where bad sector information and various system maintenance information is written. Each of the MR-heads 12 is composed of a thin film head for data writing and an MR-sensor for data reading, and is mounted on an arm 14 extending from an arm assembly of a rotary voice coil motor (VCM) 28. For reading data, a pre-amplifier 16 pre-amplifies a read signal picked up by one of the MR-heads 12 and provides the pre-amplified read signal to a read/write channel circuit 18. For writing data, the pre-amplifier 16 writes encoded write data received from the read/write channel circuit 18 on the disk 10 through a selected one of the MR-heads 12. The read/write channel circuit 18 decodes the read signal input from the pre-amplifier 16 and provides the decoded read data and a clock pulse according to the read signal to a DDC (Disk Data Controller) 36. Further, the read/write channel circuit 18 encodes write data WDATA input from the DDC 36 and provides the encoded write data to the pre-amplifier 16. Besides, the read/write channel circuit 18 includes a servo demodulator for demodulating (detecting) various servo information from the read signal input from the pre-amplifier 16 and provides the demodulated servo information to a microcontroller 22 and a gate array (not shown). The DDC 36 controls data paths between a host computer and the disks 10, under the control of the microcontroller 22. Further, the DDC 36 interfaces data between the host computer and the microcontroller 22.

The microcontroller 22 controls the DDC 36 in response to a read/write command received from the host computer, and controls track seeking and track following. For example, the microcontroller 22 controls track following of the MR-heads 12 in response to a position error signal received from the servo demodulator, the position error signal being converted to a digital position error signal by an internal analog-to-digital converter (ADC). Further, the microcontroller 22 performs servo control according to various servo control signals output from the gate array. In addition, the microcontroller 22 outputs control signals for reading various servo information written on the disks 10 (e.g., a servo gate signal, a strobe signal and a reset signal) to the read/write channel circuit 18. A digital-to-analog converter (DAC) 24 converts a digital position control signal for the MR-heads 12, generated from the microcontroller 22, to an analog position control signal. A VCM driver 26 provides the VCM 28 with a current I(t) for driving an actuator in response to the position control signal input from the DAC 24. The VCM 28 mounted on a side of the actuator, on another side of which the MR-heads 12 are mounted, moves the MR-heads 12 horizontally over the disks 10 in reply to the direction and level of the current I(t) input from the VCM driver 26. A motor controller 30 controls a spindle motor driver 32 according to a rotation control signal for the disks 10 generated from the microcontroller 22. The spindle motor driver 32 drives the spindle motor 34 to rotate the disks 10, under the control of the motor controller 32. A buffer memory 38 connected to the DDC 36 temporarily stores data communicated between the hard disk drive and the host computer. A memory 40 connected to the microcontroller 22 consists of a ROM (Read Only Memory) for storing a drive control program according to the present invention and a RAM (Random Access Memory) for temporarily storing data generated during control of the hard disk drive.

Figure 3:
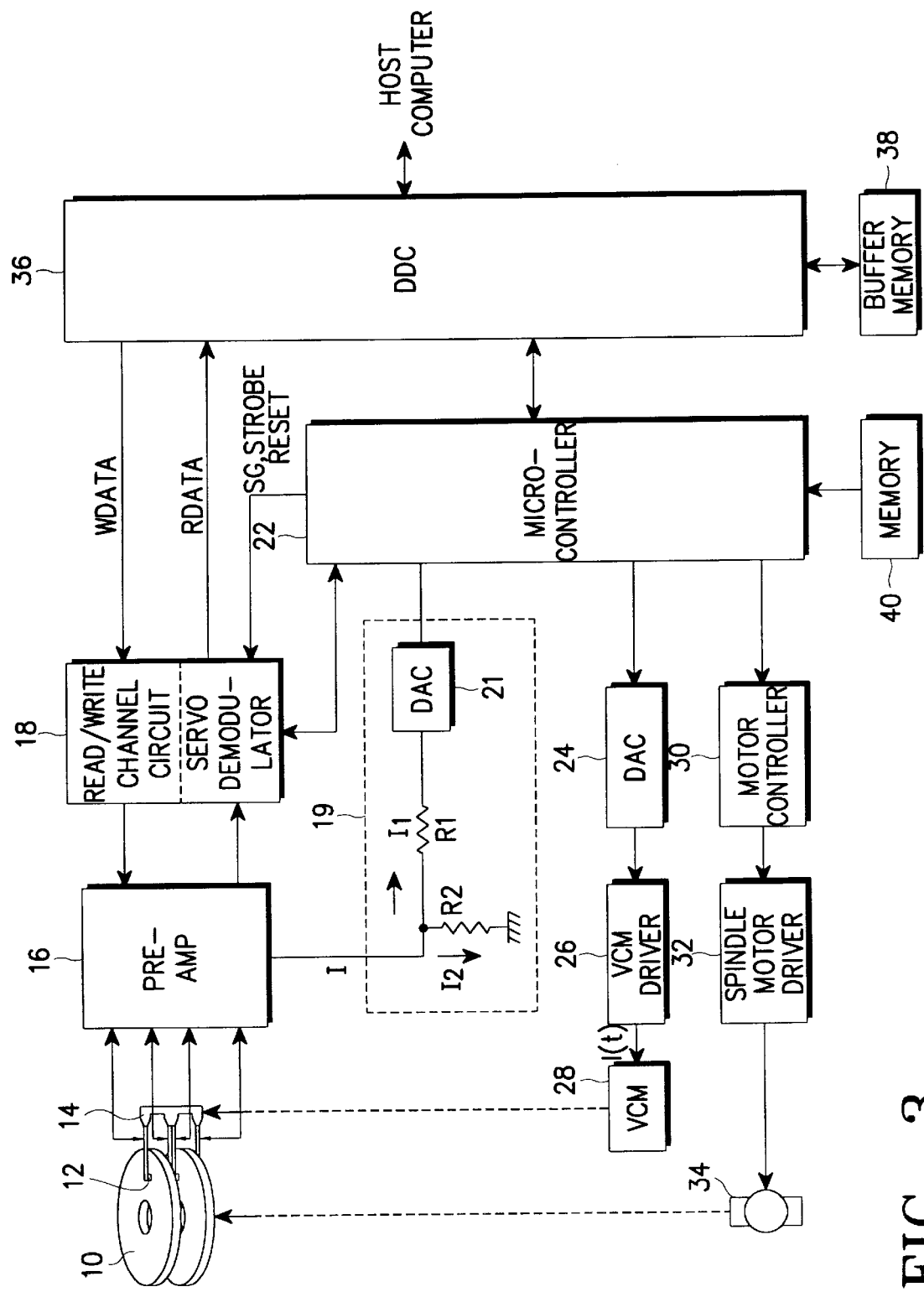
FIG. 3 is a block diagram of a hard disk drive having an MR-bias current circuit according to an embodiment of the present invention.

FIG. 3 is a block diagram of a hard disk drive having an MR-bias current circuit 19 according to an embodiment of the present invention. Referring to FIG. 3, the MR-bias current circuit 19 includes a resistor R1 connected to the pre-amplifier 16, a resistor R2 connected between the pre-amplifier 16 and the ground, and a DAC 21 connected between the resistor R1 and the microcontroller 22. As illustrated, since an MR-bias current I is the sum of a current $I_1$ flowing through the resistor R1 and a current $I_2$ flowing through the resistor R2, it is possible to control the MR-bias current I by changing a digital control input value to the DAC 21 to vary the current $I_1$ flowing through the resistor R1. The MR-bias current circuit 19 is well known in the art.

Figure 4:
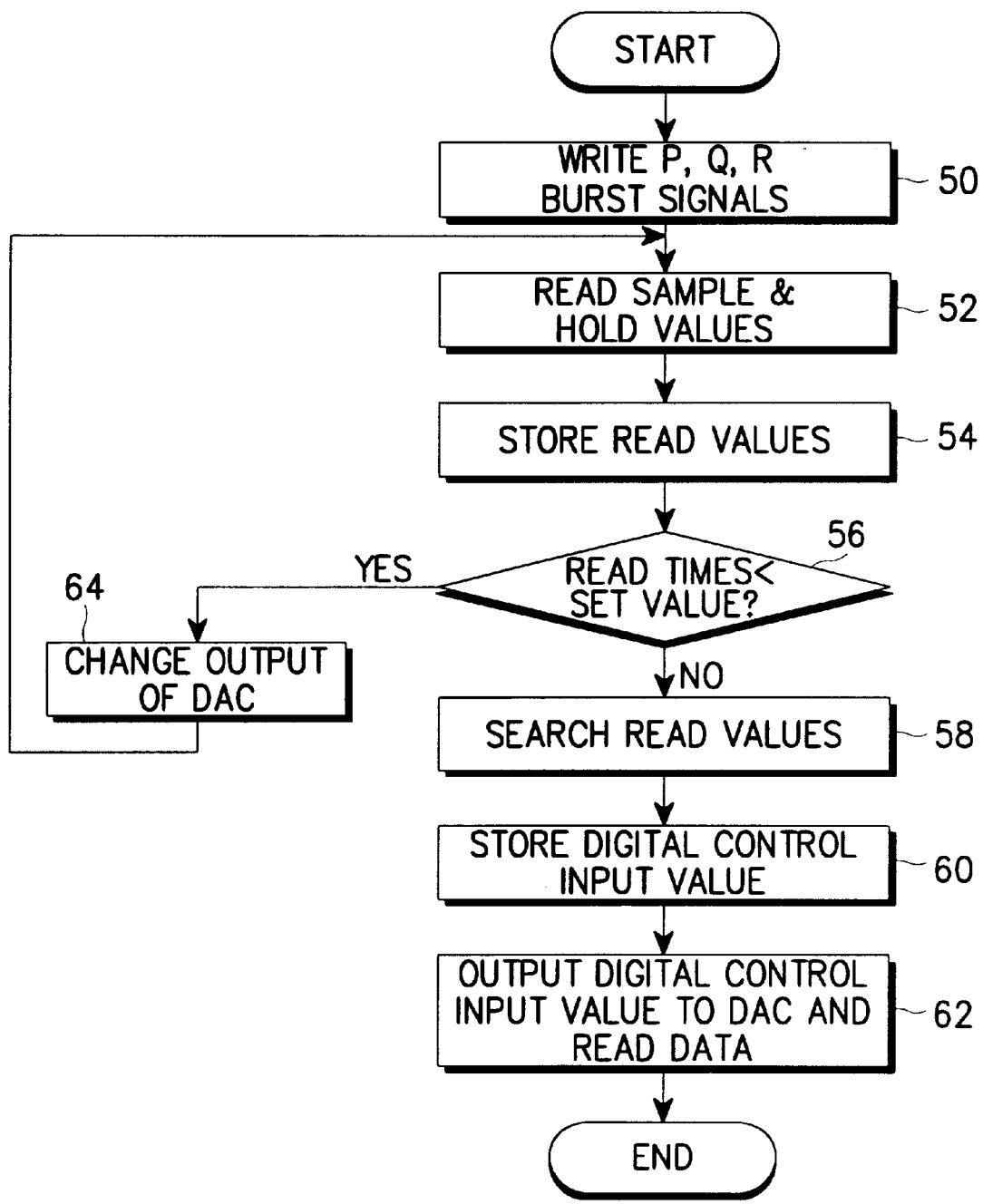
FIG. 4 is a flowchart illustrating a technique for optimizing an MR-bias current according to an embodiment of the present invention.

FIG. 4 shows the procedure for optimizing the MR-bias current according to an embodiment of the present invention, FIG. 5A shows a write pattern of the read signal, and FIG. 5B shows waveforms of the read signal and the control signals according to an embodiment of the present invention. In an exemplary embodiment of the present invention, during a manufacturing process, P, Q and R burst signals are written in a data area and, an active interval of a servo gate signal SG is then extended to an area where the P, Q and R burst signals are written. In the active interval of the SG signal, the MR-bias current is optimized by repeatedly reading a sample-and-hold value.

Referring to FIG. 5A, the write pattern includes a servo area where A, B C and D servo burst signals are written and the data area where P, Q and R burst signals are written. The A to D servo burst signals are written in a specific pattern for controlling on-track of the MR-heads 12, and the P, Q and R burst signals have a specific pattern for optimizing the MR-bias current. The P, Q and R burst signals are written in the data area in the manufacturing process by using a direct write mode. In the specification, it is assumed that the P, Q and R burst signals are written in the pattern of "000000", "10101010101" and "000000", respectively. The direct write mode mentioned above refers to a mode prepared in the read/write channel circuit 18, for directly writing user data on the disks 10 by bypassing the encoding and scrambling functions. The reason for writing the P, Q and R burst signals in a front region of the data area is to prevent maloperation of the servo control.

Reference will be made to a technique for optimizing the MR-bias current in a burn-in process which is a part of the hard disk drive manufacturing process, with reference to FIGS. 4 to 5B. Initially, the microcontroller 22 writes the P, Q and R burst signals in step 50. In writing the burst signals, the microcontroller 22 first sets the direct write mode and writes "000000", "10101010101" and "000000" in the leading portion of the data area. Here, the read signal picked up by the MR-head 12 is shown in FIG. 5B, and the sample-and-hold values of the P, Q and R burst signals have the minimum, maximum and minimum values, respectively.

After writing the P, Q and R burst signals, the microcontroller 22 extends in step 52 an active interval of the SG signal up to an area where the R burst signal is written. Further, in the step 52, the microcontroller 22 outputs a strobe signal and a reset signal shown in FIG. 5B to the read/write channel circuit 18, so as to read the sample-and-hold values of the burst signals written respectively in the servo and data areas. In FIG. 5B, waveforms A, B, C and D show amplitudes of the A, B, C and D servo burst signals which are sampled and held in the read/write channel circuit 18, and in particular, the waveforms A, B and C represent that the P, Q and R burst signals are sampled and held by the read/write channel circuit 18 at the falling edges of the reset signal. Meanwhile, the microcontroller 22 stores the above read values in the memory 40 in step 54, and checks in step 56 whether the read times is smaller than a predetermined value. If the read times is smaller than the predetermined value, the microcontroller 22 changes the digital control input value to the DAC 21 in step 64 so as to vary an output voltage of the DAC 21 and thereafter, returns to the step 52. That is, the microcontroller 22 repeats the steps 52 through 56 to change the MR-bias current step by step, until the read times is equal to the predetermined value. In this condition, the microcontroller 22 reads the sample-and-hold values of the P, Q and R burst signals and stores the read values in the memory 40.

Meanwhile, if the read times is equal to the predetermined value, the microcontroller 22 searches in step 58 the read values stored in the memory 40 and select an output voltage of the DAC 21 where the P and R burst signals have the minimum amplitude and the Q burst signal has the maximum amplitude, because the P, Q and R burst signals are written in the data area as the minimum, maximum and minimum values, respectively. Therefore, the microcontroller 22 can set an MR-bias current supply condition of preventing the data read error through the steps 50 to 58. In step 60, the microcontroller 22 stores in a data storage a digital control input value corresponding to the output voltage of the DAC 21 selected in step 58. For the data storage, the maintenance area of the disks 10 or a nonvolatile memory can be used.

The microcontroller 22 reads in step 62 the digital control input value stored in the data storage and outputs it to the DAC 21 in the MR-bias current circuit 19, to perform a data read operation. The data read operation after the step 62 refers to a process performed after the burn-in process of steps 50 through 58 or a condition after shipment of the products.

In this way, the optimal digital control input value for the respective MR-heads 12 is written in the maintenance area of the disks 10. Each time the hard disk drive is powered up, the microcontroller 22 reads the digital control input value written in the maintenance area and outputs it to the DAC 21 in the MR-bias current circuit 19, thereby preventing the data read error.

In summary, a signal having a given write pattern is written in the data area and then read while changing an output voltage of the DAC 21 of the MR-bias current circuit 19. If the amplitude of the read signal is equal to the write pattern, the digital control input value corresponding to the output voltage of the DAC 21 is set to an optimal value, so as to optimize the MR-bias current. It is possible to prevent the data read error through optimization of the MR-bias current, thereby enhancing the production yield and the reliability of the hard disk drive.

While the present invention has been described in detail with reference to the specific embodiment of the present invention, it is a mere exemplary application. Thus, it is to be clearly understood that many variations can be made by anyone skilled in the art within the scope and spirit of the present invention.

What is claimed is:

1. A method of optimizing an MR (magneto resistive)-bias current in a hard disk drive including MR-elements, recording media and a bias current circuit for supplying a bias current to the respective MR-elements, the method comprising the steps of:
   (a) writing signal patterns of given amplitudes in a specified area of said recording media;
   (b) reading sample-and-hold values of a read signal in said signal patterns while changing the bias current supplied to a selected MR-element, and storing said read sample-and-hold values; and
   (c) searching said stored sample-and-hold values to select a sample-and-hold value equal to the amplitude of the signal patterns written in said specified area, determining the bias current supplied to the MR-element as an optimal value to obtain said selected sample-and-hold value, and storing said optimal value of the bias current in the recording media.

2. The method as claimed in claim 1, said stored optimal value of the bias current being read upon power up of the hard disk drive.

3. The method as claimed in claim 2, said optimal value of the bias current being written in a maintenance area of said recording media.

4. The method as claimed in claim 1, said steps (a) to (c) being performed during a manufacturing process of said hard disk drive.

5. The method as claimed in claim 4, said steps (a) to (c) being performed with respect to each of said MR-elements.

6. A method of optimizing an MR-bias current in a hard disk drive including MR-elements, the method comprising the steps of:

writing signal patterns of given amplitudes in a data area following a servo area;

extending, during data read, an active interval of a servo gate signal to an area where said signal patterns are written;

reading sample-and-hold values of a read signal in said signal pattern while changing a bias current supplied to a selected MR-element each time said servo gate signal is activated, and storing said read sample-and-hold values; and searching said stored sample-and-hold values to select a sample-and-hold value equal to the amplitude of the signal patterns written in said data area, determining the bias current supplied to the MR-element as an optimal value to obtain said selected sample-and-hold value, and storing said optimal value of the bias current in a non-volatile memory.

7. A method of optimizing an MR (magneto resistive)-bias current in a hard disk drive including MR-elements, recording media and a bias current circuit for supplying a bias current to the respective MR-elements, the method comprising the steps of:

(a) writing signal patterns of given amplitudes in a specified area of said recording media;

(b) reading sample-and-hold values of a read signal in said signal patterns while changing the bias current supplied to a selected MR-element, and storing said read sample-and-hold values; and (c) searching said stored sample-and-hold values to select a sample-and-hold value equal to the amplitude of the signal patterns written in said specified area, determining the bias current supplied to the MR-element as an optimal value to obtain said selected sample-and-hold value, and storing said optimal value of the bias current in a non-volatile memory.

8. The method as claimed in claim 7, said stored optimal value of the bias current being read upon power up of the hard disk drive.

9. The method as claimed in claim 8, said optimal value of the bias current being written in said non-volatile memory comprising a maintenance area of said recording media.

10. The method as claimed in claim 7, said steps (a) to (c) being performed during a manufacturing process of said hard disk drive.

11. The method as claimed in claim 10, said steps (a) to (c) being performed with respect to each of said MR-elements.

12. A method of optimizing an MR-bias current in a hard disk drive including MR-elements, the method comprising the steps of:

writing signal patterns of given amplitudes in a data area following a servo area;

extending, during data read, an active interval of a servo gate signal to an area where said signal patterns are written;

reading sample-and-hold values of a read signal in said signal pattern while changing a bias current supplied to a selected MR-element each time said servo gate signal is activated, and storing said read sample-and-hold values; and searching said stored sample-and-hold values to select a sample-and-hold value equal to the amplitude of the signal patterns written in said data area, determining the bias current supplied to the MR-element as an optimal value to obtain said selected sample-and-hold value, and storing said optimal value of the bias current in said hard disk.

13. An apparatus for optimizing an MR (magneto resistive)-bias current in a hard disk drive including MR-elements, recording media and a bias current circuit for supplying a bias current to the respective MR-elements, the apparatus comprising:

(a) a means for writing signal patterns of given amplitudes in a specified area of said recording media;

(b) a means for reading sample-and-hold values of a read signal in said signal patterns while changing the bias current supplied to a selected MR-element, and storing said read sample-and-hold values; and (c) a means for searching said stored sample-and-hold values to select a sample-and-hold value equal to the amplitude of the signal patterns written in said specified area, determining the bias current supplied to the MR-element as an optimal value to obtain said selected sample-and-hold value, and storing said optimal value of the bias current in the recording media.

14. The apparatus as claimed in claim 13, said stored optimal value of the bias current being read upon power up of the hard disk drive.

15. The apparatus as claimed in claim 14, said optimal value of the bias current being written in a maintenance area of said recording media.

16. The apparatus as claimed in claim 13, said means for writing, reading, and searching operating during a manufacturing process of said hard disk drive.

17. The apparatus as claimed in claim 16, said means for writing, reading, and searching operating, with respect to each of said MR-elements.

18. An apparatus for optimizing an MR-bias current in a hard disk drive including MR-elements, the apparatus comprising:

a means for writing signal patterns of given amplitudes in a data area following a servo area;

a means for extending, during data read, an active interval of a servo gate signal to an area where said signal patterns are written;

a means for reading sample-and-hold values of a read signal in said signal pattern while changing a bias current supplied to a selected MR-element each time said servo gate signal is activated, and storing said read sample-and-hold values; and means for searching said stored sample-and-hold values to select a sample-and-hold value equal to the amplitude of the signal patterns written in said data area, determining the bias current supplied to the MR-element as an optimal value to obtain said selected sample-and-hold value, and storing said optimal value of the bias current in a non-volatile memory.

19. An apparatus for optimizing an MR (magneto resistive)-bias current in a hard disk drive including MR-elements, recording media and a bias current circuit for supplying a bias current to the respective MR-elements, the apparatus comprising:

(a) a means for writing signal patterns of given amplitudes in a specified area of said recording media;

(b) a means for reading sample-and-hold values of a read signal in said signal patterns while changing the bias current supplied to a selected MR-element, and storing said read sample-and-hold values; and (c) a means for searching said stored sample-and-hold values to select a sample-and-hold value equal to the amplitude of the signal patterns written in said specified area, determining the bias current supplied to the MR-element as an optimal value to obtain said selected sample-and-hold value, and storing said optimal value of the bias current in the recording media.

20. The apparatus as claimed in claim 19, said stored optimal value of the bias current being read upon power up of the hard disk drive.

21. The apparatus as claimed in claim 20, said optimal value of the bias current being written in said non-volatile memory comprising a maintenance area of said recording media.

22. The apparatus as claimed in claim 19, said means for writing, reading, and searching operating during a manufacturing process of said hard disk drive.

23. The apparatus as claimed in claim 22, said means for writing, reading, and searching operating with respect to each of said MR-elements.

24. An apparatus for optimizing an MR-bias current in a hard disk drive including MR-elements, the apparatus comprising:

a means for writing signal patterns of given amplitudes in a data area following a servo area;

a means for extending, during data read, an active interval of a servo gate signal to an area where said signal patterns are written;

a means for reading sample-and-hold values of a read signal in said signal pattern while changing a bias current supplied to a selected MR-element each time said servo gate signal is activated, and storing said read sample-and-hold values; and a means for searching said stored sample-and-hold values to select a sample-and-hold value equal to the amplitude of the signal patterns written in said data area, determining the bias current supplied to the MR-element as an optimal value to obtain said selected sample-and-hold value, and storing said optimal value of the bias current in said hard disk.

* * * * *